United States Patent
Iwata et al.

(10) Patent No.: US 9,001,246 B2
(45) Date of Patent: Apr. 7, 2015

(54) IMAGING APPARATUS, AN IMAGING SYSTEM, AND A DRIVING METHOD OF AN IMAGING APPARATUS USING CORRECTION DATA APPLIED TO PIXELS OF SAME COLOR

(75) Inventors: Koichiro Iwata, Kawasaki (JP); Tomoyuki Noda, Kawasaki (JP); Takeshi Akiyama, Kawasaki (JP); Kazumichi Morita, Kawasaki (JP); Kazuhiro Sonoda, Yokohama (JP); Takuro Yamamoto, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 13/359,366

(22) Filed: Jan. 26, 2012

(65) Prior Publication Data
US 2012/0194717 A1  Aug. 2, 2012

(30) Foreign Application Priority Data

Jan. 31, 2011  (JP) ................................ 2011-018283

(51) Int. Cl.
| | | |
|---|---|---|
| H04N 5/335 | (2011.01) | |
| H04N 5/357 | (2011.01) | |
| H04N 5/3745 | (2011.01) | |
| H04N 5/378 | (2011.01) | |

(52) U.S. Cl.
CPC ......... *H04N 5/3575* (2013.01); *H04N 5/37457* (2013.01); *H04N 5/378* (2013.01)

(58) Field of Classification Search
USPC ........................................ 348/300
See application file for complete search history.

(56) References Cited

U.S. PATENT DOCUMENTS

| 2005/0001915 A1* | 1/2005 | Mabuchi et al. ............ 348/295 |
| 2007/0096238 A1* | 5/2007 | Oike et al. ................... 257/443 |
| 2008/0001067 A1* | 1/2008 | Asaba et al. ............... 250/208.1 |

FOREIGN PATENT DOCUMENTS

| CN | 101257563 A | 9/2008 |
| CN | 101287064 A | 10/2008 |
| CN | 101729805 A | 6/2010 |
| EP | 1965585 A2 | 9/2008 |
| EP | 2180514 A2 | 4/2010 |
| JP | H09-051485 A | 2/1997 |
| JP | 2008-219423 A | 9/2008 |
| JP | 2008-270299 A | 11/2008 |
| KR | 10-2008-0080948 A | 9/2008 |
| KR | 10-2010-0100694 A | 9/2010 |

\* cited by examiner

*Primary Examiner* — Usman Khan
(74) *Attorney, Agent, or Firm* — Canon USA, Inc. IP Division

(57) ABSTRACT

An imaging apparatus includes a pixel unit, an amplifying transistor, and a control unit. The pixel unit includes a first photoelectric conversion unit generating a first charge based on incident light of a first color, a second photoelectric conversion unit generating a second charge based on incident light of the first color, and a third photoelectric conversion unit generating a third charge based on incident light of a second color. The amplifying transistor is provided in common to the first to third photoelectric conversion units, and outputs a signal based on the first, second, and third charges generated by the first, second, and third photoelectric conversion units, respectively. The control unit sets the pixel unit to a selected state or a non-selected state according to an electric potential of a control terminal of the amplifying transistor.

9 Claims, 8 Drawing Sheets

IMAGING APPARATUS, AN IMAGING SYSTEM, AND A DRIVING METHOD OF AN IMAGING APPARATUS USING CORRECTION DATA APPLIED TO PIXELS OF SAME COLOR

BACKGROUND

1. Technical Field

Embodiments of the present invention relate to an imaging apparatus, an imaging system, and a method for driving the imaging apparatus.

2. Description of the Related Art

In a field of imaging devices such as CMOS imagers, techniques that enable high resolution and high frame read out have been recently known.

A technique to share circuit elements such as an amplifying transistor among a plurality of photoelectric conversion units for achieving high resolution is known. In this technique, Japanese Patent Application Laid Open No. 2008-219423 describes a technique to achieve a high speed read out.

In the technique described in Japanese Patent Application Laid Open No. 2008-219423, a pixel unit is set to a selected state or a non-selected state by an electric potential of a floating diffusion (referred to as FD hereinbelow) unit, that is, a gate of the amplifying transistor. When a pixel unit in which a plurality of photoelectric conversion units share a single amplifying transistor is set to a selected state from a non-selected state, the electric potential of the FD unit largely changes, requiring a relatively long time for this change of the electric potential to settle. Therefore, when a signal is read out from a pixel of a first row within the pixel unit immediately after the pixel unit is set to the selected state from the non-selected state, the change of electric potential of the FD unit affects the signal that is read out. On the other hand, when signals are read out from a second and subsequent rows after the signal is read out from the first row, the pixel unit maintains the selected state, so the change of electric potential of the FD unit is smaller than that in the first row.

There is an increasing need for high quality images. If the influence of the change of the electric potential of the FD unit differs between the first row and the second and subsequent rows, the obtained image exhibits bright and dark bands. Further, in an image sensing apparatus provided with color filters, when the influence of the change of the FD unit differs between pixels of the same color, correction by a downstream circuitry becomes complex. Accordingly, it is desirable for the difference to be small. The above described change of electric potential may be more recognized when image quality further progresses.

SUMMARY

In an aspect of the embodiments, an imaging apparatus comprises a pixel unit including a first photoelectric conversion unit generating a charge based on incident light of a first color, a second photoelectric conversion unit generating a charge based on incident light of the first color, a third photoelectric conversion unit generating a charge based on incident light of a second color, an amplifying transistor provided in common to the first to third photoelectric conversion units, and outputting a signal based on the charge generated by the first to third photoelectric conversion units, a control unit setting the pixel unit to a selected state or a non-selected state according to an electric potential of a control terminal of the amplifying transistor, wherein the control unit, sets the pixel unit to the non-selected state prior to an operation of outputting the signal from the amplifying transistor based on the first photoelectric conversion unit, and sets the pixel unit to the non-selected state after the operation of outputting the signal based on the first photoelectric conversion unit is performed, and prior to an operation of outputting the signal based on the second photoelectric conversion unit, and does not set the pixel unit to the non-selected state after the operation of outputting the signal based on the first photoelectric conversion unit is performed, and prior to an operation of outputting the signal based on the third photoelectric conversion unit.

In another aspect of the present disclosure, an imaging apparatus comprises a pixel unit including a plurality of photoelectric conversion units, an amplifying transistor provided in common to the plurality of photoelectric conversion units, and outputs a signal based on a charge generated by the photoelectric conversion unit, and a read out circuit for processing the signal, having at least two channels, a control unit setting the pixel unit to a selected state or a non-selected state according to an electric potential of a control terminal of the amplifying transistor, wherein the control unit, sets the pixel unit to the selected state after setting the pixel unit to the non-selected state, prior to read out operations for signals based on a plurality of the pixels included in the pixel unit, and processed by an identical one of the channels, and does not set the pixel unit to the non-selected state prior to a read out operation for at least one of the pixels included in the pixel unit, and processed by another one of the channels.

In another aspect of the present disclosure, an imaging apparatus comprises a pixel unit including at least three photoelectric conversion units, and an amplifying transistor provided in common to the at least three photoelectric conversion units, and outputting a signal based on a charge generated by any one of the at least three photoelectric conversion units, and a control unit setting the pixel unit to a selected state or a non-selected state according to an electric potential of a control electrode of the amplifying transistor, wherein the control unit sequentially outputs signals based on the at least three photoelectric conversion units, and performs in an alternate manner, an operation of setting the pixel unit to the non-selected state prior to an operation of outputting the signal from the pixel unit based on one of the photoelectric conversion units, and an operation of outputting the signal based on another one of the photoelectric conversion units without intervening the operation of setting the pixel unit.

In another aspect of the present disclosure, a driving method of an imaging apparatus, the imaging apparatus comprises a pixel unit including a first photoelectric conversion unit generating a charge based on incident light of a first color, a second photoelectric conversion unit generating a charge based on incident light of the first color, a third photoelectric conversion unit generating a charge based on incident light of a second color, and an amplifying transistor provided in common to the first to third photoelectric conversion units, and outputting a signal based on the charge generated by the first to third photoelectric conversion units, wherein the method comprises setting the pixel unit to a selected state or a non-selected state according to an electric potential of a control terminal of the amplifying transistor, setting the pixel unit to the non-selected state prior to an operation of outputting the signal from the amplifying transistor based on the first photoelectric conversion unit, and setting the pixel unit to the non-selected state after the operation of outputting the signal based on the first photoelectric conversion unit is performed, and prior to an operation of outputting the signal based on the second photoelectric conversion unit, and not setting the pixel unit to the non-selected state after the operation of outputting the signal based on the first photoelectric conversion unit is performed, and prior to an operation of outputting the signal based on the third photoelectric conversion unit.

In another aspect of the present disclosure, a driving method of an imaging apparatus, the imaging apparatus comprises a pixel unit including at least three photoelectric conversion units, and an amplifying transistor provided in common to the at least three photoelectric conversion units, and outputting a signal based on a charge generated by any one of the at least three photoelectric conversion units, wherein the method comprises setting the pixel unit to a selected state or a non-selected state according to an electric potential of a control electrode of the amplifying transistor, sequentially outputting signals based on the at least three photoelectric conversion units, and performing in an alternate manner, an operation of setting the pixel unit to the non-selected state prior to an operation of outputting the signal from the pixel unit based on one of the photoelectric conversion units, and an operation of outputting the signal based on another one of the photoelectric conversion units without intervening the operation of setting the pixel unit.

Further features of the present disclosure will become apparent from the following description of exemplary embodiments (with reference to the attached drawings).

DESCRIPTION OF THE EMBODIMENTS

One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. An operation in a flowchart may be optional. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

First Embodiment

Figure 1:
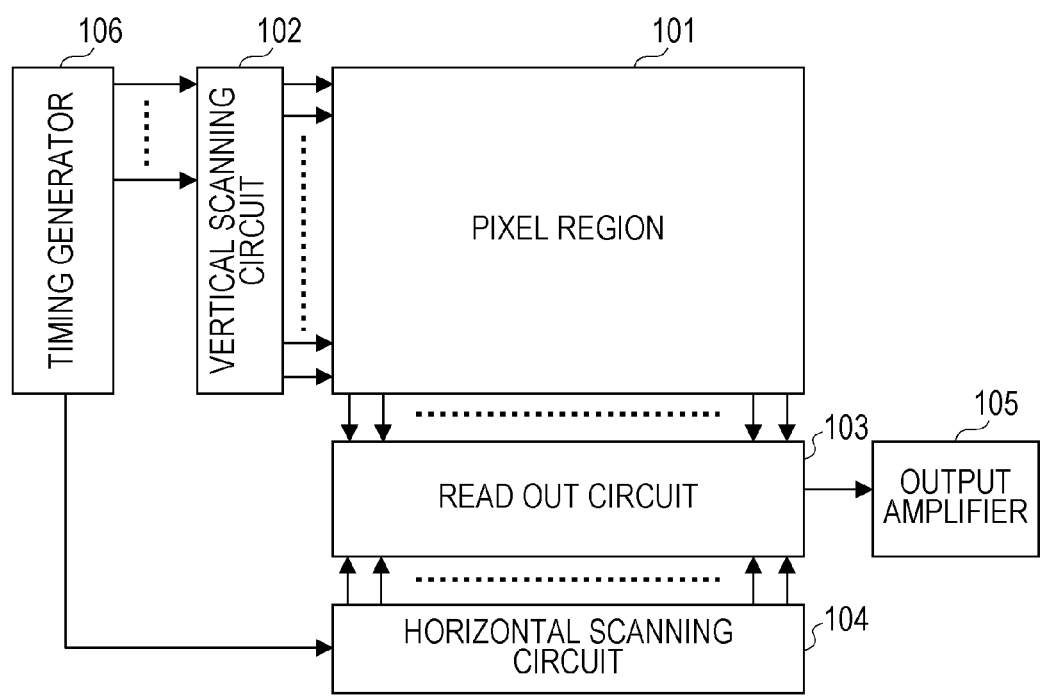
FIG. 1 is a block diagram of an exemplary configuration of an imaging apparatus.

FIG. 1 is a block diagram illustrating an exemplary configuration of an imaging apparatus. The imaging apparatus 1 includes a pixel region 101, a vertical scanning circuit 102, a read out circuit 103, a horizontal scanning circuit 104, an output amplifier 105, and a timing generator 106. The pixel region 101 is a region in which a plurality of pixels is arranged in a matrix. The vertical scanning circuit 102 controls the pixels by rows, and output driving signals related to the operation of the pixels. The read out circuit 103 is a circuitry that processes signals output from pixels, and may include a sample and hold (S/H) circuit, a CDS circuit, an amplifier, or an A/D converter, for example. The horizontal scanning circuit 104 controls the read out circuit 103, and causes the read out circuit 103 to output a signal to the output amplifier 105. The timing generator 106 supplies a timing signal for controlling the operations of the vertical scanning circuit 102 and the horizontal scanning circuit 104.

Figure 2:
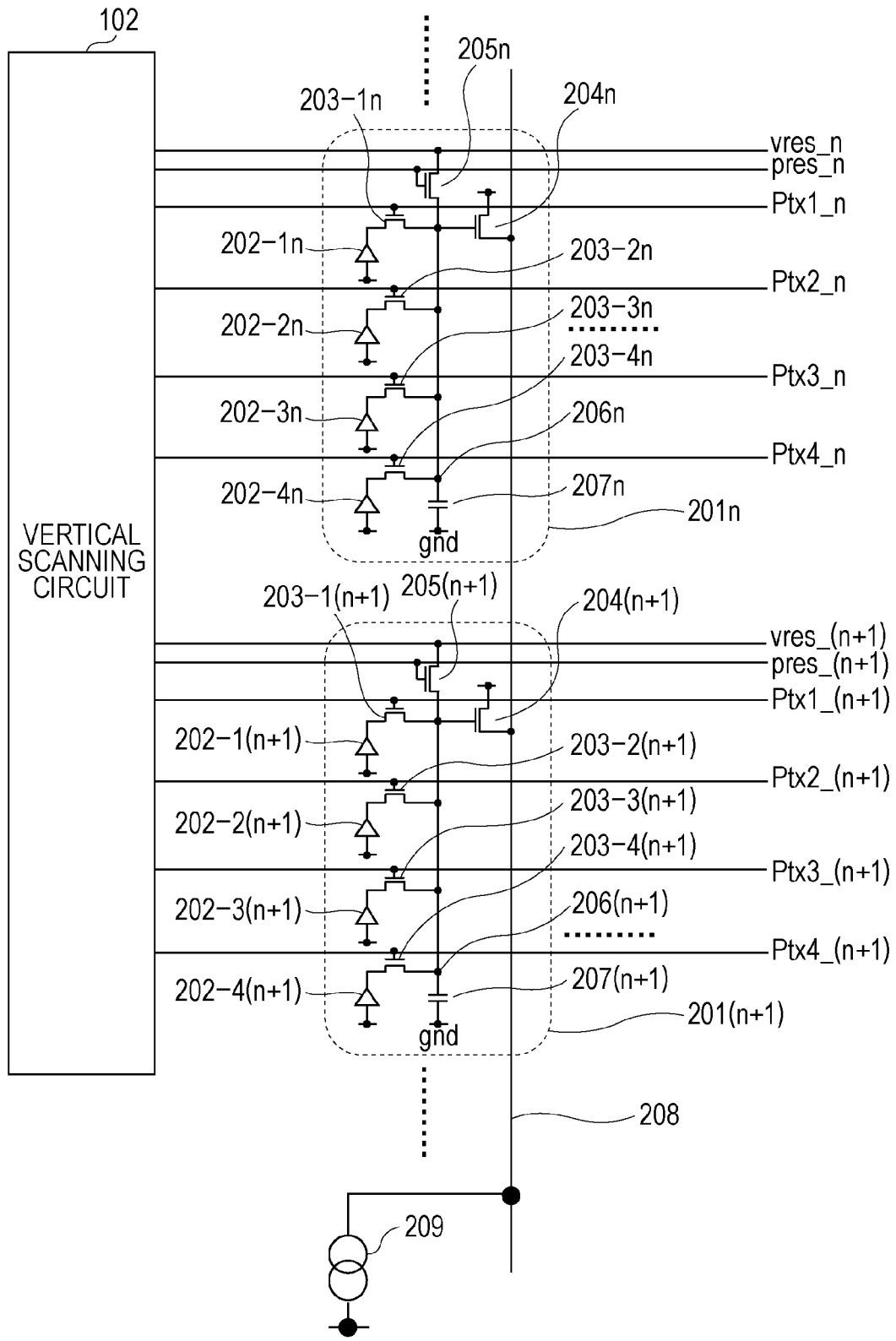
FIG. 2 is an equivalent circuit diagram of an exemplary configuration of the pixel region of the first embodiment.

Next, the configuration of the pixel region 101 will be described in detail with reference to FIG. 2. FIG. 2 illustrates pixels of eight rows and one column among the plurality of pixels, and the vertical scanning circuit 102.

A pixel unit 201$n$ includes four rows of pixels, and the pixel of the first row includes a photodiode 202-1$n$, a transfer transistor 203-1$n$, an amplifying transistor 204$n$, and a reset transistor 205$n$. The pixel of the second row includes a photodiode 202-2$n$, a transfer transistor 203-2$n$, amplifying transistor 204$n$, and reset transistor 205$n$. The pixel of the third row includes a photodiode 202-3$n$, a transfer transistor 203-3$n$, amplifying transistor 204$n$, and reset transistor 205$n$. The pixel of the fourth row includes a photodiode 202-4$n$, a transfer transistor 203-4$n$, amplifying transistor 204$n$, and reset transistor 205$n$. Amplifying transistor 204$n$ and reset transistor 205$n$ are provided in common to the adjacent four rows of pixels. Each photodiode which is a photoelectric conversion unit, generates and accumulates charges based on incident light. FD 206$n$ is a node at a control electrode of the amplifying transistor 204$n$, and FD capacitance 207$n$ is a capacitance accompanying FD 206$n$. For each of the transferring transistors 203-1$n$-203-4$n$, one of the main electrodes are connected to the photodiode of the corresponding row, and the other of the main electrodes are connected to FD 206$n$. Each of the transferring transistors 203-1$n$-203-4$n$ are controlled by signals Ptx1_$n$-Ptx4_$n$ supplied to their control electrodes. When a transferring transistor turns on, the charge accumulated in the corresponding photodiode is transferred to FD 206$n$, and stored in FD capacitance 207$n$. The amplifying transistor 204$n$, when in a selected state, outputs to a vertical signal line 208 a signal according to the electric potential of FD206$n$. The reset transistor 205$n$ is controlled by signal pres_n, and resets the electric potential to an electric potential according to power supply vres_n. In order to set the pixel unit 201$n$ to a selected state, the control electrode is reset to an electric potential that allows the amplifying transistor 204$n$ to operate as an amplifier in conjunction with a constant current source 209. Further, in order to set the pixel unit 201$n$ to a non-selected state, the control electrode is reset to an electric potential that does not allow the amplifying transistor 204$n$ to operate as an amplifier in conjunction with the constant current source 209. Description on pixel unit 201($n$+1) is omitted since it has a same configuration as that of the pixel unit 201$n$.

Figure 3:
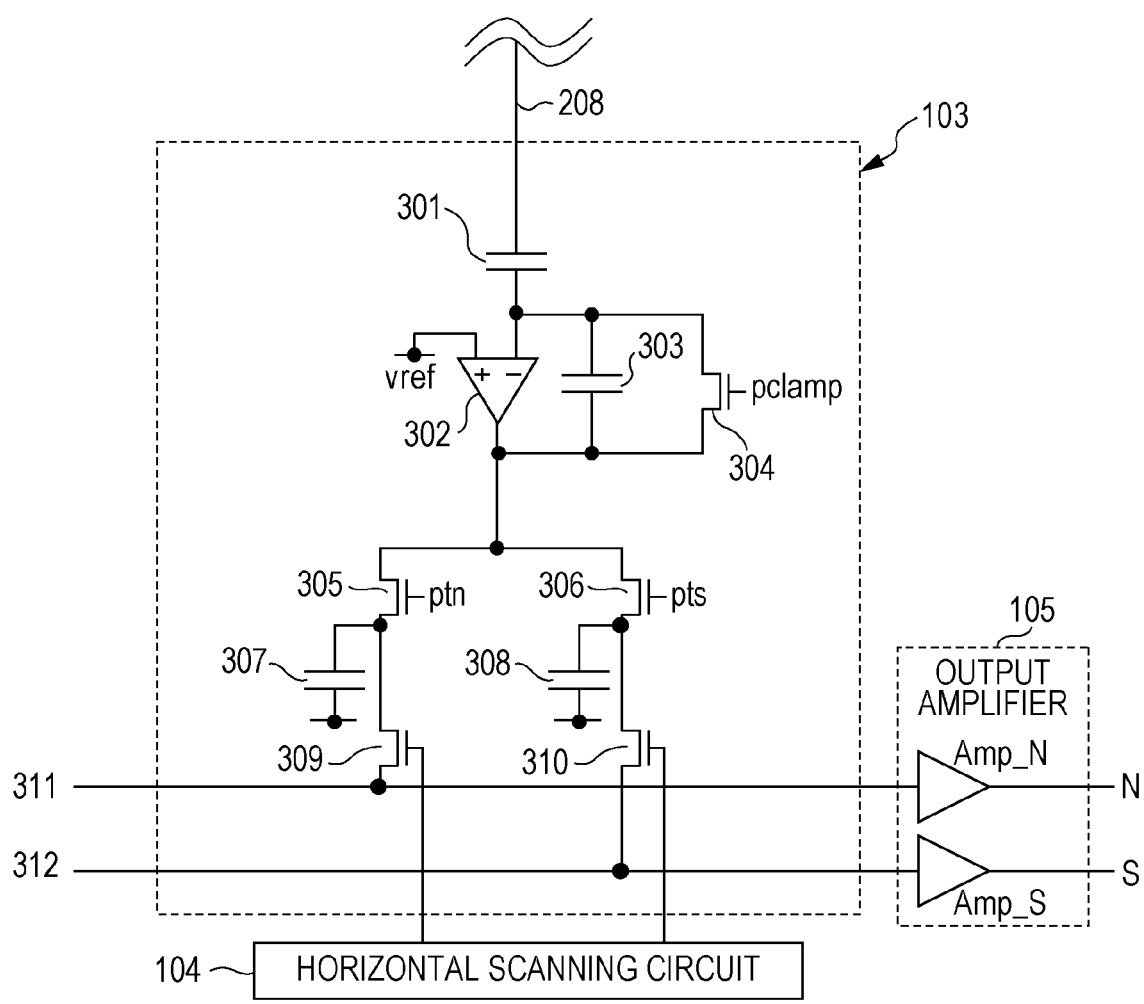
FIG. 3 is an equivalent circuit diagram of an exemplary configuration of the read out circuit of the first embodiment.

Next, the read out circuit 103 will be described in detail with reference to FIG. 3. FIG. 3 focuses on the read out circuit 103 corresponding to one column, the horizontal scanning circuit 104, and the output amplifier 105.

FIG. 3 is an exemplary configuration of the read out circuit 103 having a CDS circuit, an amplifier, and a S/H circuit. The read out circuit 103 includes a clamp capacitor 301, a differential amplifier 302, a feedback capacitor 303, a feedback switch 304, S/H switches 305 and 306, S/H capacitors 307 and 308, and switches 309 and 310.

One electrode of the clamp capacitor 301 is connected to the vertical signal line, and the other electrode is connected to the inverting input terminal of the differential amplifier 302, one electrode of the feedback capacitor 303, and one terminal of the feedback switch 304. An output terminal of the differential amplifier 302 is connected to the other electrode of the feedback capacitor 303 and the other terminal of the feedback switch 304, and further to the S/H switches 305 and 306. The clamp capacitor 301, the differential amplifier 302 and the feedback switch constitutes a clamp circuit as a CDS circuit. A reference voltage vref is supplied to the non-inverting input terminal of the differential amplifier 302. The clamp capacitor 301, the differential amplifier 302, and the feedback capacitor 303 constitutes a capacitive feedback type amplifier, and the gain of the capacitive feedback type amplifier is determined by the capacitance ratio of the feedback capacitor 303 and the clamp capacitor 301. The S/H capacitors 307 and 308 respectively holds a signal output from the differential amplifier 302 via corresponding S/H switch 305 or 306. When switches 309 and 310 turn on, signals held by the S/H capacitors 307 and 308 are transmitted to the output amplifier 105 via horizontal signal lines 311 and 312. Although FIG. 3 illustrates a configuration in which amplifier Amp-N or Amp-S is provided independently to the horizontal signal lines 311 and 312, other configurations are possible. For example, a differential amplifier whose two input terminals are connected to the horizontal signal lines 311 and 312 may be employed instead of the amplifiers Amp-N and Amp-S.

To clarify advantages of this disclosure, a problem that may occur with the technique of Japanese Patent Application Laid Open No. 2008-219423, when sequentially reading out signals from four rows of pixels in the pixel unit 201n of the above described imaging apparatus will be explained first. Suppose that in the pixel region 101, color filters of a Bayer pattern are provided corresponding to the photoelectric conversion units. That is, for the pixels of eight rows and one column illustrated in FIG. 2, color filters of the same color are arranged every two rows. More generally speaking, the pixel region includes a plurality of pixel units, and pixels included in a pixel unit are arranged along a column, and pixels of the first and second colors are arranged in an alternate manner. Here, having the same color means having the same wavelength characteristic. Suppose that both pixel units 201n and 201(n+1) are in the non-selected state at and before time t1-1. Also, the following description will be made supposing that signal pres_(n+1) is the same as signal pres_n. Further, signals vres_sh, pres_sh, and ptx_sh are shown as "electronic-shutter-pulses." These signals are signals supplied to a drain of the reset transistor, control electrode of the reset transistor, and the control electrode of the transferring transistor, respectively, for a row in which an electronic shutter operation is performed in order to control an accumulation period. The electronic shutter operation of the present embodiment is performed in a period referred to as state A.

Figure 4:
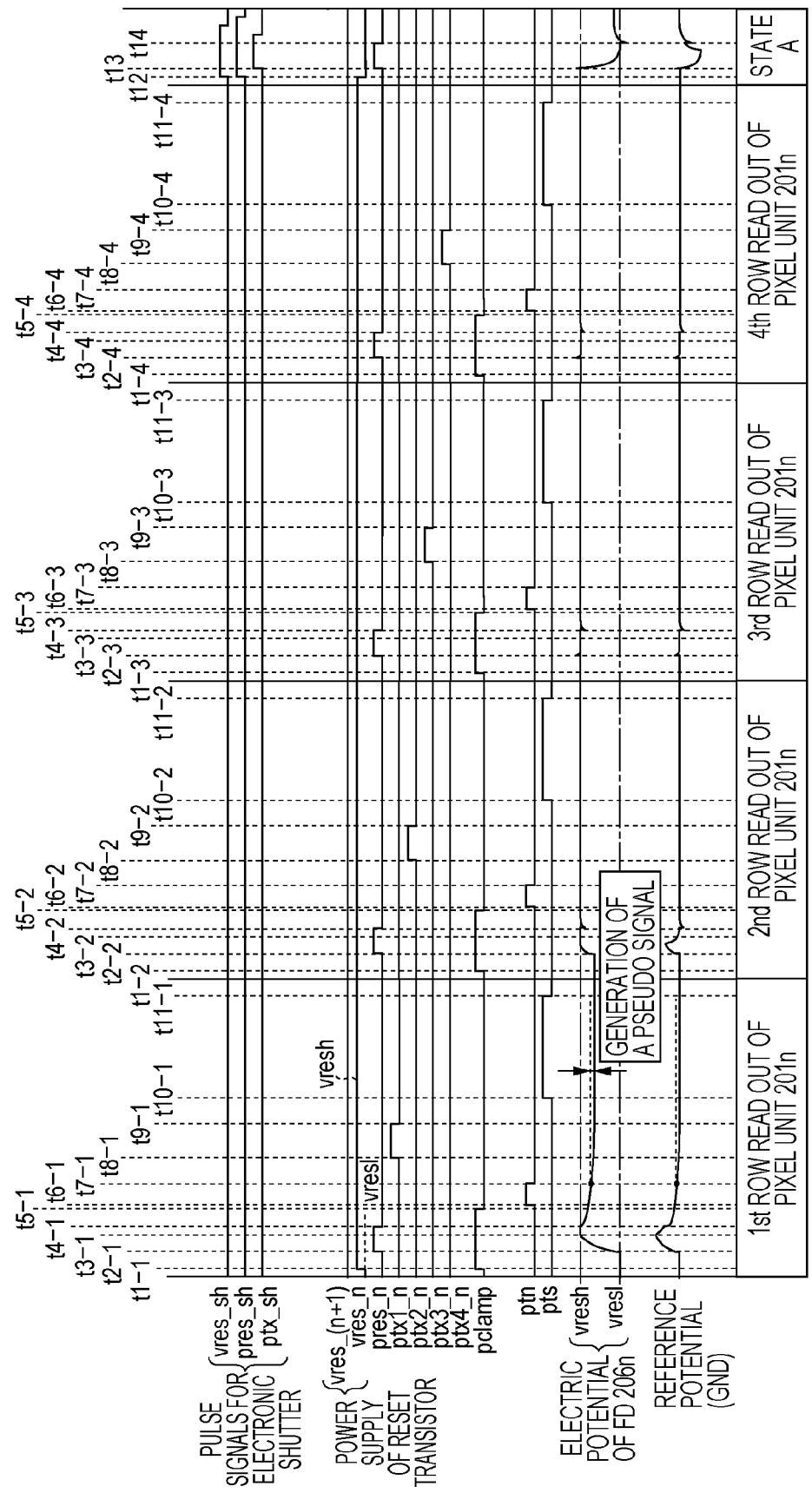
FIG. 4 is a timing diagram of an exemplary operation of the first embodiment.

First, in FIG. 4, a read out operation for a pixel of the first row including a first photoelectric conversion unit that generates a charge based on incident light of the first color is performed. At time t1-1, power supply vres_n shifts to a high electric potential vresh. Also at time t1-1, signal pclamp becomes high level, thereby turning the feedback switch 304 to a conducting state, and the both electrodes of the feedback capacitor 303 are short-circuited. At this state, since the inverting input terminal and the output terminal of the differential amplifier 302 is short-circuited, the differential amplifier 302 operates as a voltage follower.

At time t2-1, the electric potential of the FD capacitance 207 is reset by the power supply vresh, when the reset transistor 205n turns to a conducting state in response to a shift of signal pres_n to a high level. This causes the amplifying transistor 204n to operate as a source follower in conjunction with the constant current source 209, that is, becomes a selected state. On the other hand, since power supply vres(n+1) is low level, the electric potential of the FD capacitance 207(n+1) is reset by vresl. Therefore, the pixel unit 201(n+1) maintains its non-selected state.

Prior to time t2-1, pixel unit 201n is in a non-selected state, so when the reset transistor 205n turns to a conducting state at time t2-1, the electric potential of FD 206n changes by (vresh-vresl). FD 206n is coupled to a line providing a reference potential (GND) via FD capacitance 207n, which is a parasitic capacitance, so the reference potential tracks the change of FD 206n.

At time t3-1, the electric potential of FD 206n settles to vresh. The reference potential changes in a direction to return to the original electric potential.

At t4-1, when signal pres_n becomes low level, the reset transistor 205n turns off. FD 206n becomes an electrically floating state, or simply a floating state, the electric potential of FD 206n changes tracking the change of the reference potential returning to its original electric potential. The settling speed of the reference potential is limited by a time constant determined from the parasitic capacitance and resistance accompanying the line supplying the reference potential.

More specifically, the electric potential of the reference potential at time y after it changes is expressed by the following equation.

$$A \times \exp(-y/R \times C) \quad (1)$$

Here, A is an amplitude of the change of FD 206n, R is a resistance component of the line supplying the reference potential, and C is the capacitance component of the line supplying the reference potential.

At time t5-1, signal pclamp becomes low level, and the feedback switch turns off. This causes the potential difference between the level that appears on the vertical signal line and the reference voltage vref. That is, the level on the vertical signal line at time t5-1 is clamped, therefore only the fluctuation from the level from this point of time is supplied to the inverting input of the differential amplifier 302. Also, due to the turning off of the feedback switch 304, the differential amplifier 302 operates as a capacitive feedback type amplifier together with the clamp capacitance 301 and the feedback capacitor 303.

Signal ptn becomes high level between time t6-1 and t7-1, and an output of the differential amplifier 302 is held by the S/H capacitor 307 as an N signal. The N signal includes components such as an offset of the differential amplifier 302 and a potential fluctuation of the vertical signal line from time t5-1.

When signal ptx1_n becomes high level between time t8-1 and t9-1, a charge accumulated in the photodiode 202_1n is transferred to FD 206n, and the level on the vertical signal line changes according to the amount of charges. The fluctuation from the level on the vertical signal line at time t5-1 is amplified by the differential amplifier and output as an S signal. The S signal is a signal from which noise is reduced. That is, the clamp capacitance functions as a CDS circuit.

Here, to simplify the description, the description is made assuming that no charge due to photoelectric conversion is generated in any of the photodiodes 202_1n-202_4n. Therefore, the electric potential of FD 206n does not change even when transfer transistors 203-1n-203-4n are turned on.

Signal pts becomes high level between time t10-1 and t11-1, thereby the S signal is held by the S/H capacitor 308.

Subsequently, when switches 309 and 310 are turned on in response to a signal supplied by the horizontal scanning circuit 104, signals held by S/H capacitors 307 and 308 are transmitted to the output amplifier 105. By taking the difference of the two signals, the N signal component may be reduced from the S signal. In FIG. 4, for the purpose of simplification, horizontal scanning period in which signals for turning on switches 309 and 310 is omitted.

Following the signal read out period of a pixel in the first row, operations of read out period for the second to the fourth row are performed. The difference from the read out period of the first row is that the signal PtxN_n supplied to the transfer transistor 203N_n is replaced by the signal corresponding to that particular row.

In the operation shown in FIG. 4, the pixel unit 201n is set to a selected state prior to the read out operation of the first row, and the pixel unit 201n maintains the selected state until it is set to a non-selected state in a period shown as state A. Therefore, the fluctuation of the electric potential of FD206n is smaller for the second to the fourth rows than for the first row.

For the pixel of the first row, the fluctuation of the electric potential of FD206n and the reference potential (GND) settles between time t8-1 and t9-1. The electric potential of FD 206n tracks the fluctuation of the reference potential. If the electric potential of FD 206n is different between the holding timing t7-1 for the N signal and the holding timing t11-1 for the S signal as shown, the difference is superposed superimposed on the S signal as a pseudo signal.

If the difference is the same for all the pixel in a single pixel unit 201n, the difference may be handled as an offset, allowing a less complicated processing. However, according to the operation shown in FIG. 4, the pixel unit is maintained in the selected state during a period in which signals are read out from each of the pixels in the selected pixel unit. Due to this operation, the electric potential of FD 206n fluctuates largely when reading out the first row, while the fluctuation is smaller when reading out the second and subsequent rows, and the electric potential settles with a shorter time period. In FIG. 4, the fluctuation of the reference potential settles by t4-2 for the second row read out operation. Therefore, the electric potential of FD does not change between time t7-2 and t11-2. This results in pseudo signals that occur between timings corresponding to timings t7-1 and t11-1, to be of different magnitudes between the first row and the second and the subsequent rows. This means that influence of the pseudo signals are different between different rows within the identical pixel unit 201n, and requires to set correction data for each row. The same is true for the third and subsequent rows.

As understood from equation (1), the fluctuation of the reference potential at time y becomes smaller as the fluctuation of the electric potential of FD 206 becomes smaller. Therefore, if the fluctuation of the electric potential of FD 206 is four times greater in the first row read out operation than in the second and subsequent rows read out operations, the generated pseudo signal also becomes four times greater.

Figure 5:
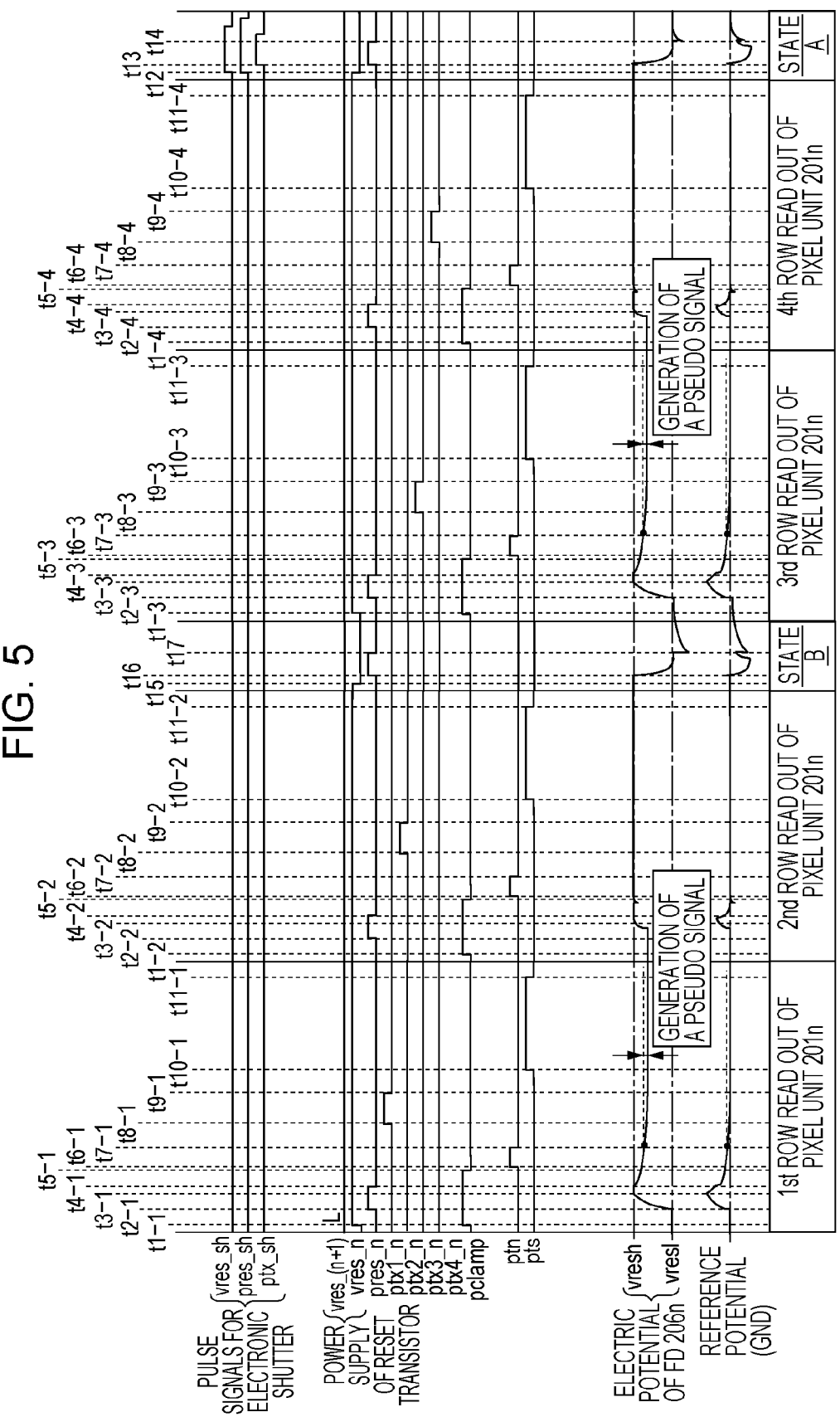
FIG. 5 is a timing diagram of a comparative example of the first embodiment.

Next, an operation according to the present embodiment is described with reference to FIG. 5. The difference from the operation shown in FIG. 4 will be mainly discussed.

A major difference from the operation shown in FIG. 4 is that the pixel unit 201n is turned to a non-selected state (state B) after the second row read out operation is completed and before the third row read out operation is performed for the pixel unit 201n.

The operation performed in state B after the second row read out operation is completed and before the third row read out operation is described.

At time t15, the power supply vres_n shifts to vresl.

Signal pres_n becomes high level in a time period from time t16 to t17, thereby causing the electric potential of FD 201n to be reset according to vresl. As explained above, because vresl is a voltage at which the amplifying transistor does not operate as an amplifier, the pixel unit 201n becomes a non-selected state. By setting the pixel unit 201n from the selected state to the non-selected state, the electric potential of FD206n changes, and the electric potential of the reference potential (GND) tracks the change. This fluctuation of electric potential of FD 206n and the reference potential is assumed to be almost settled at the beginning of the third row read out.

In the present embodiment, the pixel unit 201n becomes a selected state again by setting signal pres_n to high level after power supply vres_n shifts to vresh at time t1-3. The electric potential of FD 206n changes by (vresh-vresl) as in the first row, so pseudo signals of similar magnitude occur for the first and third rows. Also, the influences of the fluctuation of the electric potential of FD206n are of similar level for the second and fourth rows. Therefore, in an imaging apparatus having color filters of Bayer pattern, the same correction data may be applied to the pixels of the same color, thereby reducing the load of the imaging system.

To make a more general description of the imaging apparatus according to the present embodiment, a pixel unit includes a first and a second photoelectric conversion units each generating a charge based on incident light of a first color, and a third photoelectric conversion unit generating a charge based on incident light of a second color, and an amplifying transistor is provided commonly to the first to third photoelectric conversion units. An operation to set the pixel unit to a non-selected state is performed prior to operations of reading out signals based on the first and second photoelectric conversion units, and the operation to set the pixel unit to the non-selected state is not performed prior to operation of reading out a signal based on the third photoelectric conversion unit. This may make the influence of the pseudo signals due to fluctuation of the electric potential of FD unit to be of similar level for pixels performing photoelectric conversion based on incident light of a same color. On the other hand, for pixels performing photoelectric conversion based on incident light of another color, a fast read out is realized by not performing the operation to set the pixel unit to the non-selected state. Also, for a configuration with color filters of Bayer pattern, there is a second pixel unit including a fifth and sixth photoelectric conversion units each generating a charge based on incident light of the second color and a seventh photoelectric conversion unit generating a charge based on incident light of a third color, and having an amplifying transistor provided commonly to the fifth to seventh photoelectric conversion units. Operation of the second pixel unit is the same as that of the first pixel unit.

Second Embodiment

Another embodiment according to the present disclosure will be described with reference to diagrams. Although an imaging apparatus provided with color filters of Bayer pattern was exemplarily described, the present disclosure may be also applied to an imaging apparatus without color filters, or with color filters of a same color for all the pixels.

Figure 6:
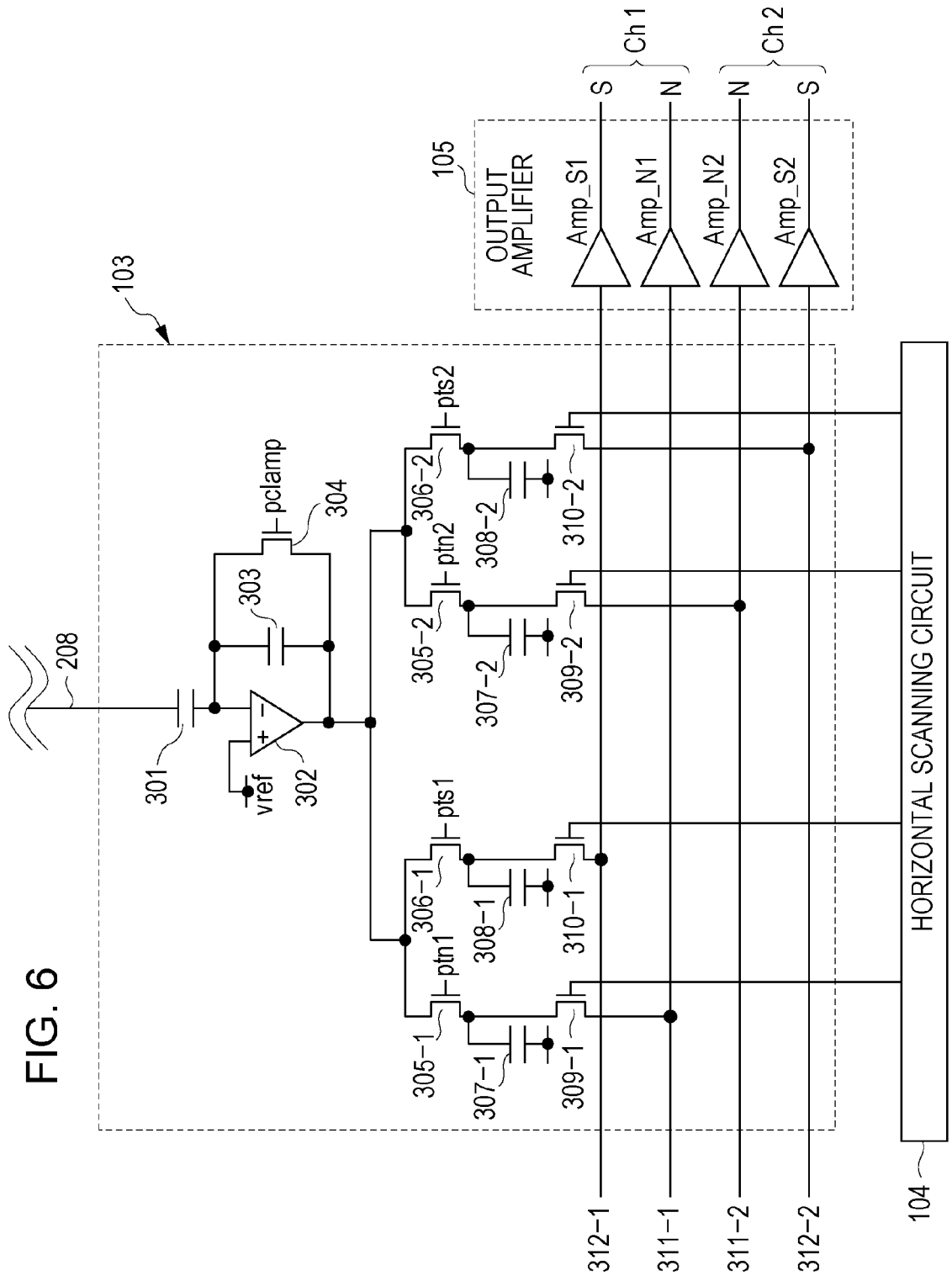
FIG. 6 is an equivalent diagram of the read out circuit of the second embodiment.

FIG. 6 is a circuit diagram illustrating a configuration of the read out circuit 103, the horizontal scanning circuit 104, and the output amplifier 105 according to the present embodiment. The difference from the configuration shown in FIG. 3 is that there are a plurality of channels in a path from the read out circuit 103 to the output amplifier 105 for a single vertical signal line. The same reference numerals are given to elements that are the same as those in FIG. 3.

In FIG. 6, the output terminal of the differential amplifier 302 is connected to S/H capacitors 307-1, 308-1, 307-2, and 308-2, respectively, via S/H switches 305-1, 306-1, 305-2, and 306-2. The S/H capacitors 307-1 and 308-1 are connected to amplifiers Amp_N1 and Amp_S1 included in the output amplifier 105, respectively, via a corresponding switch 309-1 or 310-1. The S/H capacitors 307-2 and 308-2 are connected to amplifiers Amp_N2 and Amp_S2 included in the output amplifier 105, respectively, via a corresponding switch 309-2 or 310-2. In other words, there is a plurality of channels, assuming that the path related to output amplifiers Amp_N1 and Amp_S1 is Ch1, and the path related to output amplifiers Amp_N2 and Amp_S2 is Ch2. Owing to this configuration, signals for two rows may be scanned in parallel by the horizontal scanning circuit 104, after holding signals based on the pixels of the first and second rows in their corresponding S/H capacitors 307-1, 308-1, 307-2, and 308-2. This allows a faster read out compared to the first embodiment in which the operation of the horizontal scanning period is performed on a row-by-row basis.

Next, the operation according to the present embodiment will be described with reference to FIG. 7. The description focuses on the difference from the operation described in FIG. 5.

The present embodiment differs from the first embodiment in that signals based on the first and third rows of the pixel unit 201n are output from channel Ch1, and signals based on the second and fourth rows of the pixel unit 201n are output from channel Ch2. Instead of signals ptn and pts in the first embodiment, in the present embodiment, signals ptn1, ptn2 and pts1, pts2 are employed to select which of the S/H capacitors samples and holds a signal.

According to the present embodiment, while the pixel unit 201n is in the non-selected state right before the read out operation for the pixels of the first and third rows whose signals are output via channel Ch1, the pixel unit 201n is in the selected state right before the read out operation for the pixels of the second and fourth rows whose signals are output via channel Ch2. That is, the influence of pseudo signals may be brought to a similar level on pixels outputting signals through a same channel, so correction data is required for respective channels, allowing a reduction of system load.

The present embodiment is also applicable to an imaging apparatus having color filters of Bayer pattern. Because, in Bayer pattern, pixels of a same color are arranged for every two rows and every two columns, pixels of the first and third rows in a pixel unit 201n are pixels of the same color. Since signals based on the pixels of the same color are output from an identical channel, correction for each color is realized by preparing correction data for each channel.

Figure 7:
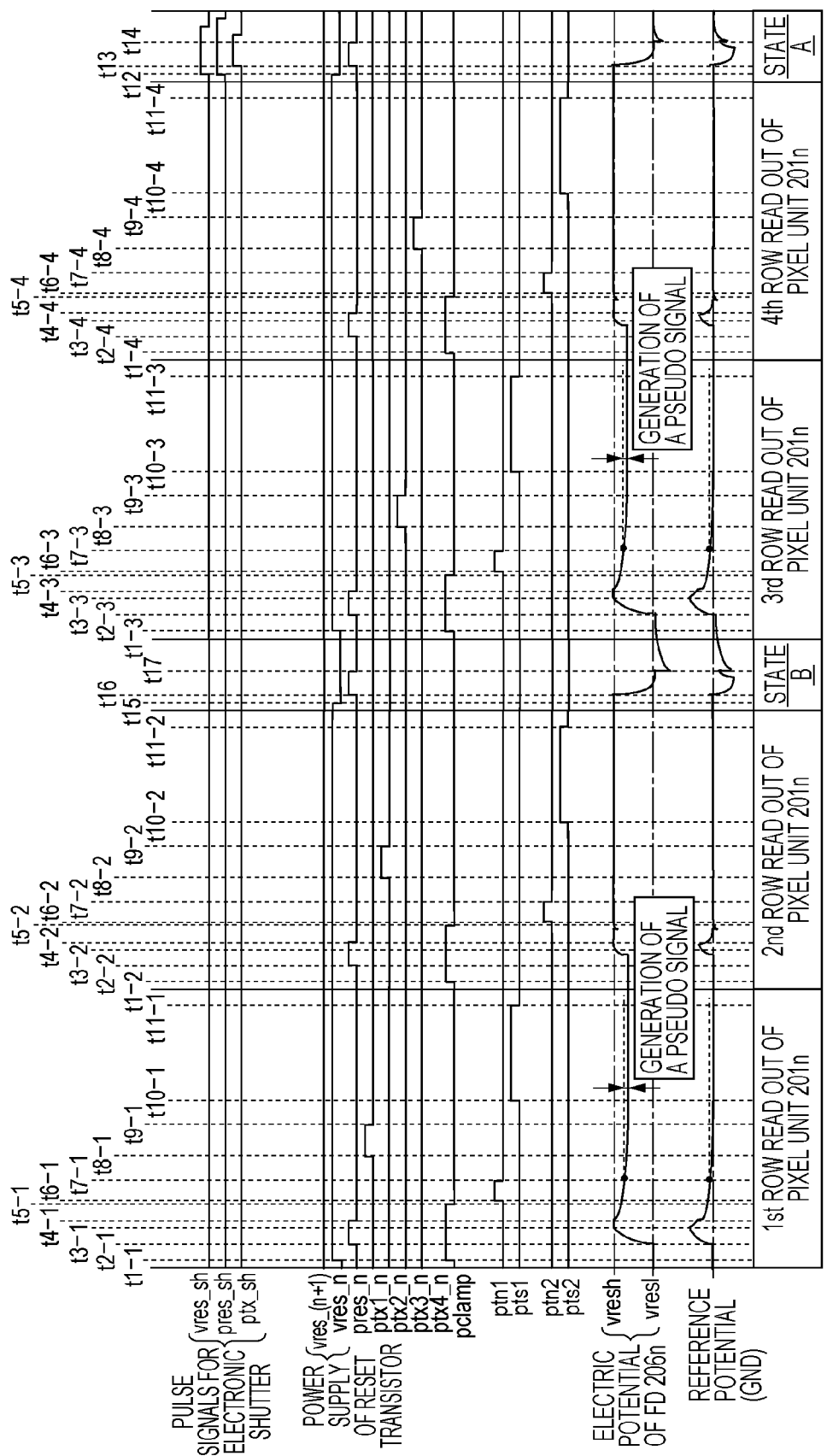
FIG. 7 is a timing diagram of an exemplary operation of the second embodiment.

Although FIG. 7 shows a configuration having two channels, the present embodiment is applicable to a configuration having more channels. To be more specific, signals based on the pixels of the same color within a pixel unit are transmitted via the same channel, also in a configuration having more than two channels.

To generalize the description of the imaging apparatus according to the present embodiment, a pixel unit includes three or more photoelectric conversion units, and sequentially outputs signals based on the three or more photoelectric conversion units. Here, an operation to set the pixel unit to a non-selected state prior to the operation of outputting a signal based on a photoelectric conversion unit, from the pixel unit, and an operation of outputting a signal based on another photoelectric conversion unit without setting the pixel unit to the non-selected state are performed in an alternate manner. This allows above described advantages.

Third Embodiment

Figure 8:
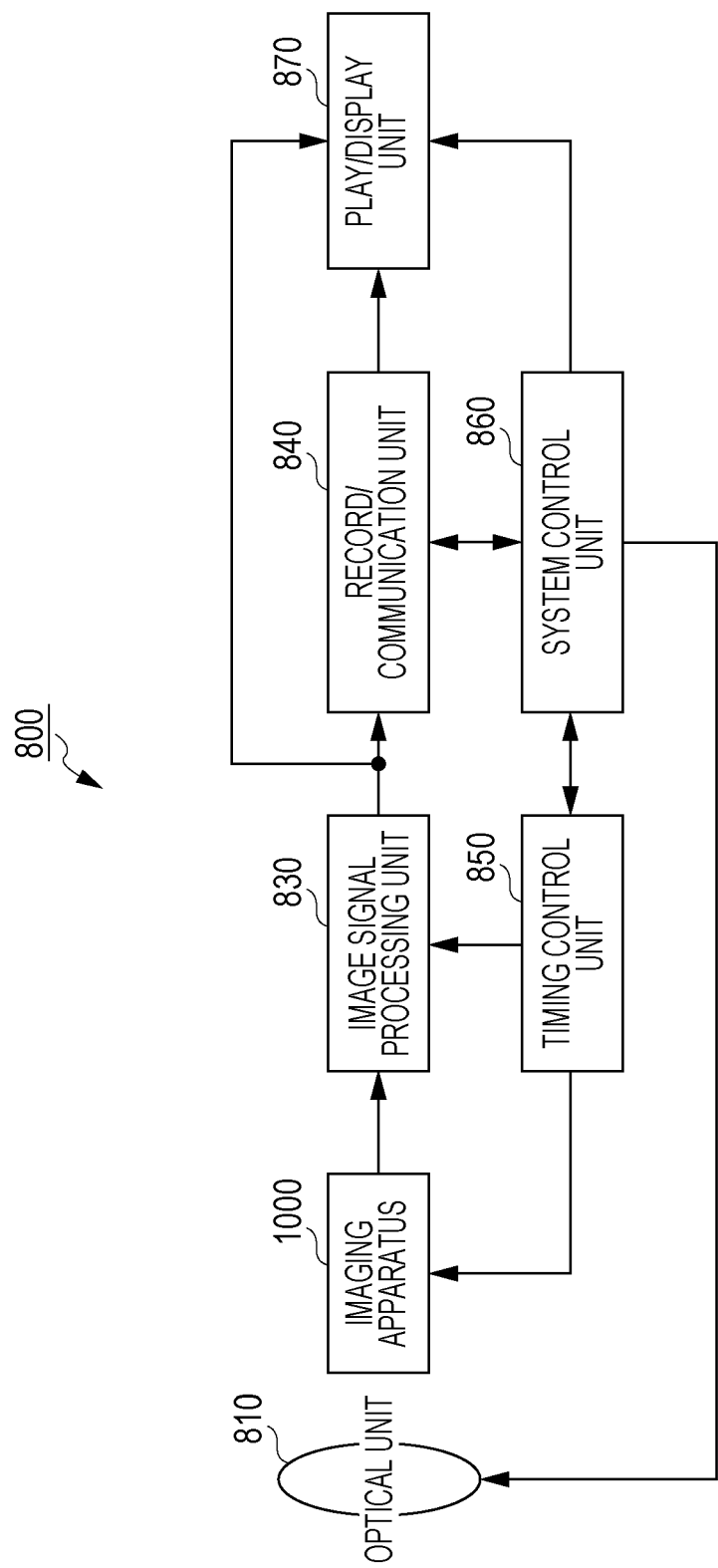
FIG. 8 is a block diagram of an exemplary configuration of an imaging system.

Next, an abstract of an imaging system according to the present embodiment will be described with reference to FIG. 8.

Imaging system 800 includes optical unit 810, imaging apparatus 1000, video signal processing unit 830, record/communication unit 840, timing control unit 850, system control unit 860, and play/display unit 870, for example. The imaging apparatus 1000 is any one of the imaging apparatuses of the foregoing embodiments. FIG. 8 shows a case where the timing generator 106 shown in FIG. 1 is included in the timing control unit 850 and not in the imaging apparatus 1000.

The optical unit 810, which is an optical system such as a lens, forms an image of light from an object on a pixel array of the imaging apparatus 1000 in which a plurality of pixels are arranged in a matrix. The imaging apparatus 1000 outputs, at a timing based on signals from the timing control unit 850, signals corresponding to light impinging onto the pixel array.

A signal output from the imaging apparatus 1000 is input to the image signal processing unit 830, and the image signal processing unit 830, according to a predetermine method by a program, for example, performs processing such as A/D conversion on the input signal. A signal obtained by processing of the image signal processing unit is transmitted to the record/communication unit as an image data. The record/communication unit 840 transmits a signal for forming an image to the play/display unit 870, and causes the play/display unit 870 to play/display moving images or a still image. The record/communication unit, in correspondence with the input of a signal from the image signal processing unit 830, communicates with the system control unit 860, as well as an operation to record to a recording medium (not shown) the signal for forming the image.

The system control unit controls the overall operation of the imaging system 800, and controls the operation of the optical unit 810, timing control unit 850, record/communication unit 840, and play/display unit 870. Further, the system control unit 860 may have a memory unit (not shown) which is a recording medium for example, and program for controlling the imaging system may be stored herein. Further, the system control unit 860 supplies a signal within the imaging system, the signal being used to switch driving modes in correspondence to the operation of a user. Some of the examples are changing rows to be read out or reset, changing field angle according to electronic zooming and shifting of field angle according to electronic vibration absorption.

The timing control unit 850 controls the operation timings of the imaging apparatus 1000 and image signal processing unit 830 based on the control of the system control unit 860 which is a control unit.

The image signal processing unit 830 holds correction data described in each of the foregoing embodiments, and performs correction on a signal output from the imaging apparatus 1000.

Other Embodiments

Aspects of the present disclosure may also be realized by a computer of a system or apparatus (or devices such as a CPU or MPU) that reads out and executes a program recorded on a memory device to perform the functions of the above-described embodiment(s), and by a method, the operations of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2011-018283, filed 31 Jan. 2011, which is hereby incorporated by reference herein in its entirety.

What is claimed is:

1. An imaging apparatus comprising:
a first pixel unit including
a first photoelectric conversion unit generating a first charge based on incident light of a first color,
a second photoelectric conversion unit generating a second charge based on incident light of the first color, and
a third photoelectric conversion unit generating a third charge based on incident light of a second color, and
a fourth photoelectric conversion unit generating a fourth charge based on incident light of the second color;
an amplifying transistor provided in common to the first to third photoelectric conversion units, and outputting a signal based on the first, second, third and fourth charges generated by the first, second, third and fourth photoelectric conversion units, respectively;
a control unit setting the first pixel unit to a selected state or a non-selected state according to an electric potential of a control terminal of the amplifying transistor; wherein the control unit,
sets the first pixel unit to the non-selected state prior to an operation of outputting the signal from the amplifying transistor based on the first photoelectric conversion unit, and
sets the first pixel unit to the non-selected state after the operation of outputting the signal based on the first photoelectric conversion unit is performed, and prior to an operation of outputting the signal based on the second photoelectric conversion unit, and
does not set the first pixel unit to the non-selected state after the operation of outputting the signal based on the first photoelectric conversion unit is performed, and prior to an operation of outputting the signal based on the third photoelectric conversion unit, and
does not set the first pixel unit to the non-selected state after the operation of outputting the signal based on the first photoelectric conversion unit is performed, and prior to an operation of outputting the signal based on the fourth photoelectric conversion unit.

2. The imaging apparatus according to claim 1, wherein the first to fourth photoelectric conversion units are arranged one dimensionally in the order of the first, third, second and fourth photoelectric conversion units.

3. The imaging apparatus according to claim 1, further comprising a read out circuit having at least two channels for processing the signals, wherein
the signals based on the first and second photoelectric conversion units are processed in an identical channel, and
the signals based on the third and fourth photoelectric conversion units are processed in another identical channel.

4. The imaging apparatus according to claim 1, further comprising a read out circuit having a channel for processing the signal, wherein
the signals based on the first to fourth photoelectric conversion units are processed in the same channel.

5. The imaging apparatus according to claim 1, further comprising a second pixel unit having
a fifth photoelectric conversion unit generating a fifth charge based on incident light of a third color;
a sixth photoelectric conversion unit generating a sixth charge based on incident light of the third color;
a seventh photoelectric conversion unit generating a fourth charge based on incident light of the second color; and
a second amplifying transistor provided in common to the fifth to seventh photoelectric conversion units, and outputting a signal based on the fifth, sixth, and seventh charges generated by the fifth, sixth, and seventh photoelectric conversion units, respectively.

6. An imaging system comprising:
the imaging apparatus according to claim 1;
an optical system forming an image on the pixel unit; and
an image signal processing unit processing a signal output from the imaging apparatus and generating an image data.

7. The imaging system according to claim 6, wherein a same correction data is applied to the signal based on the first photoelectric conversion unit and the signal based on the second photoelectric conversion unit.

8. The imaging apparatus according to claim 5, wherein,
in the first pixel unit, the first to fourth photoelectric conversion units are arranged one dimensionally in the order of the first, third, second, and fourth photoelectric conversion units, and
in the second pixel unit, the fifth to seventh photoelectric conversion units are arranged one dimensionally in the order of the fifth, seventh, and sixth photoelectric conversion units,
wherein the control unit,
sets the second pixel unit to the non-selected state prior to an operation of outputting the signal from the amplifying transistor based on the fifth photoelectric conversion unit,
sets the second pixel unit to the non-selected state after the operation of outputting the signal based on the fifth photoelectric conversion unit is performed, and prior to an operation of outputting the signal based on the sixth photoelectric conversion unit, and
does not set the second pixel unit to the non-selected state after the operation of outputting the signal based on the fifth photoelectric conversion unit is performed, and prior to an operation of outputting the signal based on the seventh photoelectric conversion unit.

9. An imaging system comprising:
the imaging apparatus according to claim 5;
an optical system forming an image on the first pixel unit; and
an image signal processing unit processing a signal output from the imaging apparatus and generating an image data.

* * * * *